Patented Dec. 11, 1951

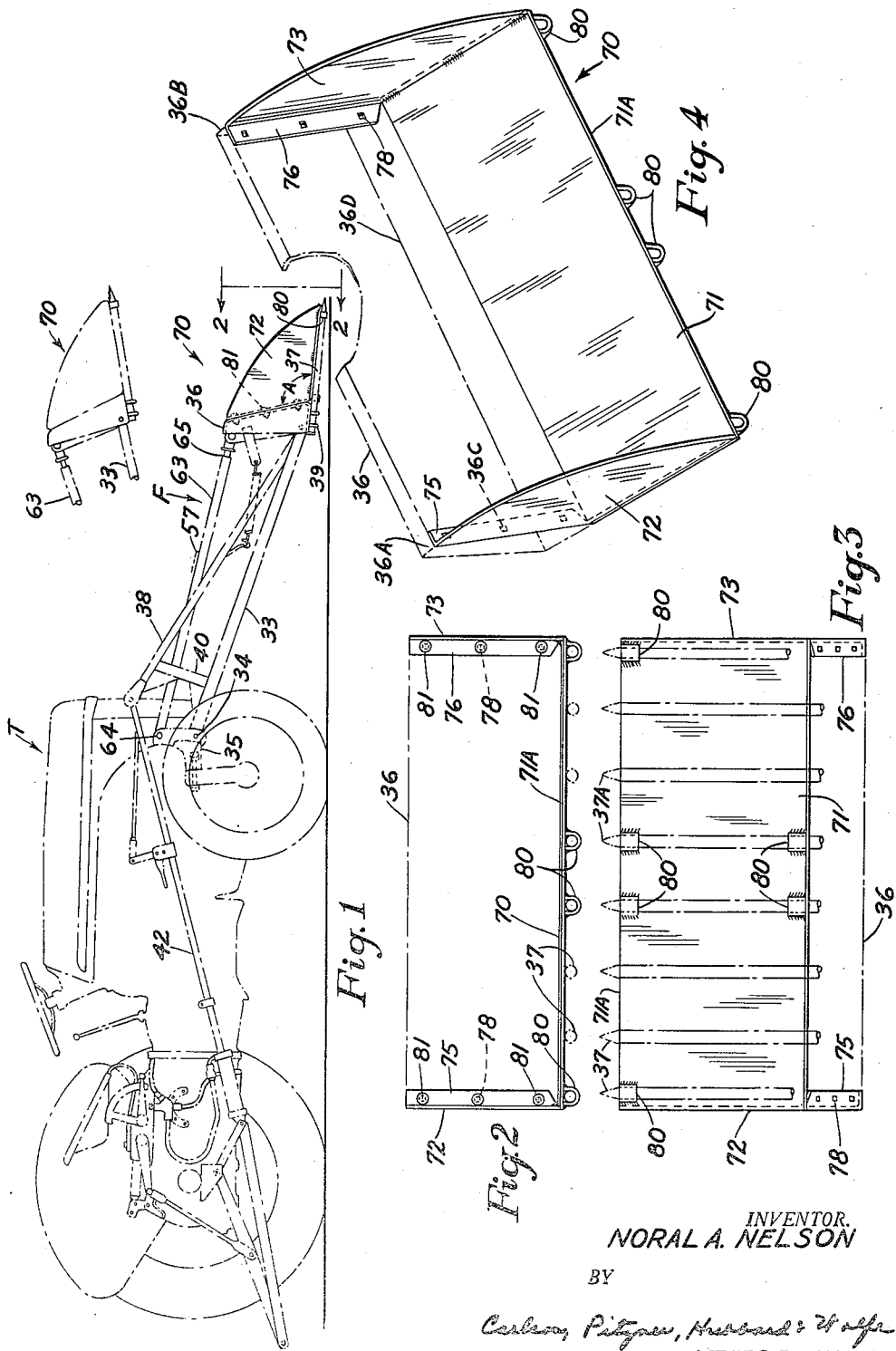

2,577,977

UNITED STATES PATENT OFFICE 2,577,977

BUCKET ATTACHMENT FOR TRACTOR MOUNTED FORKS

Noral A. Nelson, Royal Oak, Mich., assignor to Harry Ferguson, Inc., Detroit, Mich., a corporation of Delaware Application July 3, 1948, Serial No. 36,885

1 Claim. (Cl. 214—145)

The present invention pertains to tractors and more particularly to bucket attachments for a power elevated fork mounted thereon.

It is an object of the present invention to provide an improved bucket attachment for use with a tractor fork of the type having an upright shield and a series of tines extending forwardly from the lower edge thereof. It is a more detailed object to provide a bucket attachment which may be simply and cheaply constructed and installed and which makes efficient use of the points on the ends of the tines as score points for scooping up a load.

Further objects and advantages of the invention will become apparent as the following description proceeds taken in connection with the accompanying drawings, in which:

Figure 1 is a side elevation of a bucket attachment embodying the present invention and shown as applied to a tractor and tractor fork, the latter appearing simply in dot-dash outline.

Fig. 2 is a front elevation of the bucket attachment shown in Fig. 1.

Fig. 3 is a bottom view of the bucket attachment.

Fig. 4 shows the bucket attachment in perspective with the shield of the fork indicated in dot-dash outline.

While the invention is susceptible of various modifications and alternative constructions, I have shown in the drawing and will herein describe in detail one embodiment of the invention. It is to be understood, however, that I do not intend to limit the invention by such disclosure, but aim to cover all modifications and alternative constructions falling within the spirit and scope of the invention as expressed in the appended claim.

Referring to the drawing there is shown in outline a tractor T having a power elevated fork F connected thereto for operation by the tractor hydraulic system. The tractor will be readily identifiable by those skilled in the art as a tractor of well known commercial form equipped with the power elevated draft linkage of Henry George Ferguson, Patent No. 2,118,180, issued May 24, 1938.

The fork F and associated mechanism is disclosed in my copending application Serial No. 14,763, filed on March 13, 1948, to which reference is made. Only a general understanding of the fork mechanism is necessary for an appreciation of the present invention. In general, the fork is arranged in a manner to utilize the raising of the tractor draft linkage for lifting the load thereon. Provision is made, however, for utilizing an auxiliary hydraulic actuator mechanism for imparting an initial raising movement to the load before any raising of the draft linkage takes place. The use of such auxiliary actuator mechanism makes it possible to greatly increase the load which may be broken free for raising without exceeding safe values of fluid pressure in the hydraulic system.

The particular fork attachment F here shown includes a lifting device comprising a pair of booms 33 projecting forwardly from the region of the tractor front wheels and pivoted at their rear ends at 34 to bracket 35 detachably fixed to the front axle of the tractor. Rockably mounted on the forward ends of these booms 33 is a generally upright shield 36. This shield is preferably in the form of a flat metal plate reinforced at its lateral edges by vertical channel portions 36a, 36b having holes 36c therein for the reception of fastening bolts.

Preferably the shield includes a horizontal rearwardly extending base portion 36d to which tines may be securely clamped. It will thus be seen that the shield 36 together with its side portions 36a, 36b and its base portion 36d constitutes a rigid box-like support.

In Figure 1 the tines indicated at 37 are fastened to the base portion 36d either by welding or by appropriate clamps 39. Each of the tines includes a sharpened point 37a. Rigid with each of the booms 33 are upwardly and rearwardly extending bars 38, the rear portions of which are connected to the associated booms by spacers 40 welded thereto to form a rigid triangular structure. The elevated ends of the bars 38 afford pivotal attaching points for rearwardly extending tension connectors 42 lying on either side of the tractor. The latter are arranged to be pulled rearwardly by the tractor power lift mechanism with the forks swinging upwardly on the booms about the pivots 34.

To keep the fork generally horizontal as it is raised, forwardly extending struts 63 are employed which are pivotally connected at their rear ends to upstanding bars 64 on the bracket 35. Attachment at the forward end of the struts is made to the upper edge of the shield 36 by means of a sleeve joint 65. As more fully discussed in the copending application referred to, the joint 65 may be released by a latch indicated generally at 57 so that the fork topples forwardly for dumping purposes upon triggering by the operator. It will be understood by one skilled in the art that the booms 33 and the strut construction 63 form a parallelogram type of linkage to limit the amount of upward tilt of the tines 37 when the latter are elevated into the upraised position.

With the construction of the fork in mind, attention may next be given to the specific bucket attachment which is adapted in a novel manner for use therewith. This bucket attachment indicated generally at 70 includes a bottom plate 71 and two sector-shaped side plates 72, 73. The latter have inwardly turned flanges 75, 76 along the read edges thereof. The bottom plate 71 may be secured to the side plates 72, 73 by means of welding as shown or, if desired, the entire bucket may be constructed of a single piece of metal bent into a generally U-shape.

In accordance with one of the aspects of the invention, the angle A between the flanges 75, 76 and the bottom plate 71 is made to correspond to the angle between the tines of the fork and the associated shield (see Fig. 1). In this way the bucket attachment may be flatly supported on the series of tines 37 with the flanges 75, 76 presented abuttingly to the shield 36. Bolt holes 78 are provided in the flanges 75, 76 to enable the flanges to be bolted securely to the shield 33 and prevent dislodgment thereof.

In accordance with another aspect of the invention, the bottom plate 71 is dimensioned so that the leading edge 71a thereof falls short of the tips 73a on the tines 37. As a result the latter extend forwardly of the leading edge of the bottom plate serving as score points to pierce and cause initial cleavage of the material being scooped up. Because of the thickness of the tines at the point corresponding to the leading edge of the bottom plate, it has been found that sufficient initial cleavage takes place that the leading edge 71a may enter the material to be raised with substantially no abrasion or wear on the leading edge. It has been found that densely packed and frozen material may be readily penetrated.

To insure that the bottom plate stays flatly against the tines under all conditions of use, the bottom plate includes metal loops 80 welded thereto which are spaced apart a distance corresponding to the spacing of the tines.

With the bucket attachment constructed as shown, installation is a very simple matter. It is merely necessary to run the tines into the loops 80 and then slip fastening bolts 81 into place in the holes 78 provided in the flanges 75, 76. No modification of the fork is required except for providing spaced holes in the forward surface of the shield 33 for receiving the bolts. The arrangement may be constructed at minimum cost and the flexibility provided is evident. In practical field use it has been found to nearly double the usefulness of the fork assembly.

In use the fork is lowered and the tractor run forwardly in low gear to push the points 37a and the leading edge 71a into the pile of material to be transported. The hydraulic control on the tractor is then moved to the "raise" position which pulls the rods 42 rearwardly and causes upward swing of the fork and attached bucket. Because of the parallelogram nature of the linkage 33, 63, the bucket tips upwardly only a limited amount so that the contents are held securely and without danger of dislodgment.

I claim as my invention:

The combination with a tractor fork of the type having a shield provided with a vertically disposed front wall, a rearwardly extending bottom wall, and a plurality of parallel, forwardly extending tines secured to the underneath surface of said bottom wall and extending horizontally forwardly therefrom in spaced relationship, of a bucket attachment for said fork comprising a sheet metal structure including a flat bottom plate and a pair of sector shaped side plates extending vertically upwardly from the side edges of said bottom plate, each of said side plates being provided with a vertically extending rear edge, a laterally extending inturned attachment flange extending along the rear edge of each side plate, means for removably securing said flanges to the side regions of the front wall of said shield, said bottom plate resting on the upper surfaces of said tines and being substantially in the plane of the rearwardly extending bottom wall of said shield and, when assembled on said fork, constituting a forward extension thereof, and a plurality of U-shaped attachment loops welded to the underneath surface of said bottom plate along the front edge thereof and straddling said tines to maintain the bottom plate securely in position on said tines, said shield and side plates in combination constituting an open ended four sided scoop-like bucket or receptacle.

NORAL A. NELSON.

REFERENCES CITED

The following references are of record in the file of this patent:

UNITED STATES PATENTS

| Number | Name | Date |
|---|---|---|
| 890,061 | Jarboe | June 9, 1908 |
| 921,498 | Agler | May 11, 1909 |
| 947,964 | Collins et al. | Feb. 1, 1910 |
| 1,574,444 | Reynolds | Feb. 23, 1926 |
| 2,190,164 | Seyller | Feb. 13, 1940 |
| 2,326,197 | Blecha | Aug. 10, 1943 |
| 2,421,566 | Kober | June 3, 1947 |
| 2,429,717 | Gordon | Oct. 28, 1947 |
| 2,496,563 | Siems | Feb. 7, 1950 |